(12) United States Patent
Montgomery et al.

(10) Patent No.: US 9,056,587 B2
(45) Date of Patent: Jun. 16, 2015

(54) ROPS MOUNT FOR WORK VEHICLE DISPLAY INTERFACE

(71) Applicant: Deere & Company, Moline, IL (US)

(72) Inventors: James L. Montgomery, Dubuque, IA (US); Jason C. Lahey, Dubuque, IA (US); Randal A. Cufr, Kernersville, NC (US)

(73) Assignee: deere & Company, Moline, IL (US)

( * ) Notice: Subject to any disclaimer, the term of this patent is extended or adjusted under 35 U.S.C. 154(b) by 189 days.

(21) Appl. No.: 13/783,042

(22) Filed: Mar. 1, 2013

(65) Prior Publication Data

US 2014/0246468 A1 Sep. 4, 2014

(51) Int. Cl.
- B60R 11/02 (2006.01)
- B60K 37/02 (2006.01)
- B60R 11/00 (2006.01)

(52) U.S. Cl.
CPC ..... B60R 11/0229 (2013.01); B60R 2011/0084 (2013.01); B60K 37/02 (2013.01); B60R 2011/008 (2013.01)

(58) Field of Classification Search
CPC .................................................... B60K 37/02
USPC ......... 224/548, 553–554, 410, 443, 281, 510, 224/929, 274, 495; 384/57–58, 21, 35, 53; 248/920, 480, 279.1, 298.1
See application file for complete search history.

(56) References Cited

U.S. PATENT DOCUMENTS

| | | | | |
|---|---|---|---|---|
| 2,711,872 A | * | 6/1955 | Lampke | 248/103 |
| 5,743,653 A | * | 4/1998 | Katoh | 384/43 |
| 6,149,308 A | * | 11/2000 | Schroeder et al. | 384/50 |
| 6,315,180 B1 | * | 11/2001 | Watkins | 224/275 |
| 6,517,040 B1 | * | 2/2003 | Wen | 248/278.1 |
| 8,596,599 B1 | * | 12/2013 | Carson et al. | 248/429 |
| 8,827,226 B2 | * | 9/2014 | Townsend et al. | 248/323 |
| 2006/0124323 A1 | * | 6/2006 | Glover et al. | 172/2 |
| 2008/0029669 A1 | | 2/2008 | Olah et al. | |
| 2009/0224016 A1 | * | 9/2009 | Stautzenberger, Sr. | 224/571 |

FOREIGN PATENT DOCUMENTS

| | | |
|---|---|---|
| DE | 20310327 U1 | 10/2003 |
| DE | 102004044163 B3 | 4/2006 |

OTHER PUBLICATIONS

United Kingdom Patent Office Search Report for related application No. GB10402478.0, dated Sep. 3, 2014.

(Continued)

*Primary Examiner* — Justin Larson
*Assistant Examiner* — Scott McNurlen
(74) *Attorney, Agent, or Firm* — Quarles & Brady LLP

(57) ABSTRACT

An adjustable mounting assembly capable of mounting an operator display interface to the ROPS of a work vehicle that has front and rear implements, such as the front loader and rear excavator of a backhoe. The adjustable mounting assembly can have a telescoping compound slide assembly with at least one movable rail and slider. The moveable rail and slider can translate to move a display mount linearly between the front or rear of the vehicle. A display bracket can rotate about a generally vertical axis. Detents or other positioning elements can be provided on the rails and slider as well as at preset angular orientations of the display mount. The adjustable mounting assembly thus allows the vehicle operator to readily adjust the display interface to be viewable when in the front and rear facing seating orientations of the vehicle.

20 Claims, 12 Drawing Sheets

(56) References Cited

OTHER PUBLICATIONS

RAM Mounts, Vehicle Mounting Catalog, Admitted Prior Art.
McMaster-Carr, Spring Plungers, Admitted Prior Art.
The Precision Alliance, MR18 Heavy Linear Bearing Rail, http://onlinecatalog.tpa-us.com/Asset/Rail-MR.JPG, Admitted Prior Art\.
The Precision Alliance, R. Series Roller Sliders, http://onlinecatalog.tpa-us.com/Asset/Slider.JPG, Admitted Prior Art.
The Precision Alliance, R. Series Rollers, http://onlinecatalog.tpa-us.com/Asset/Roller.JPG.

* cited by examiner

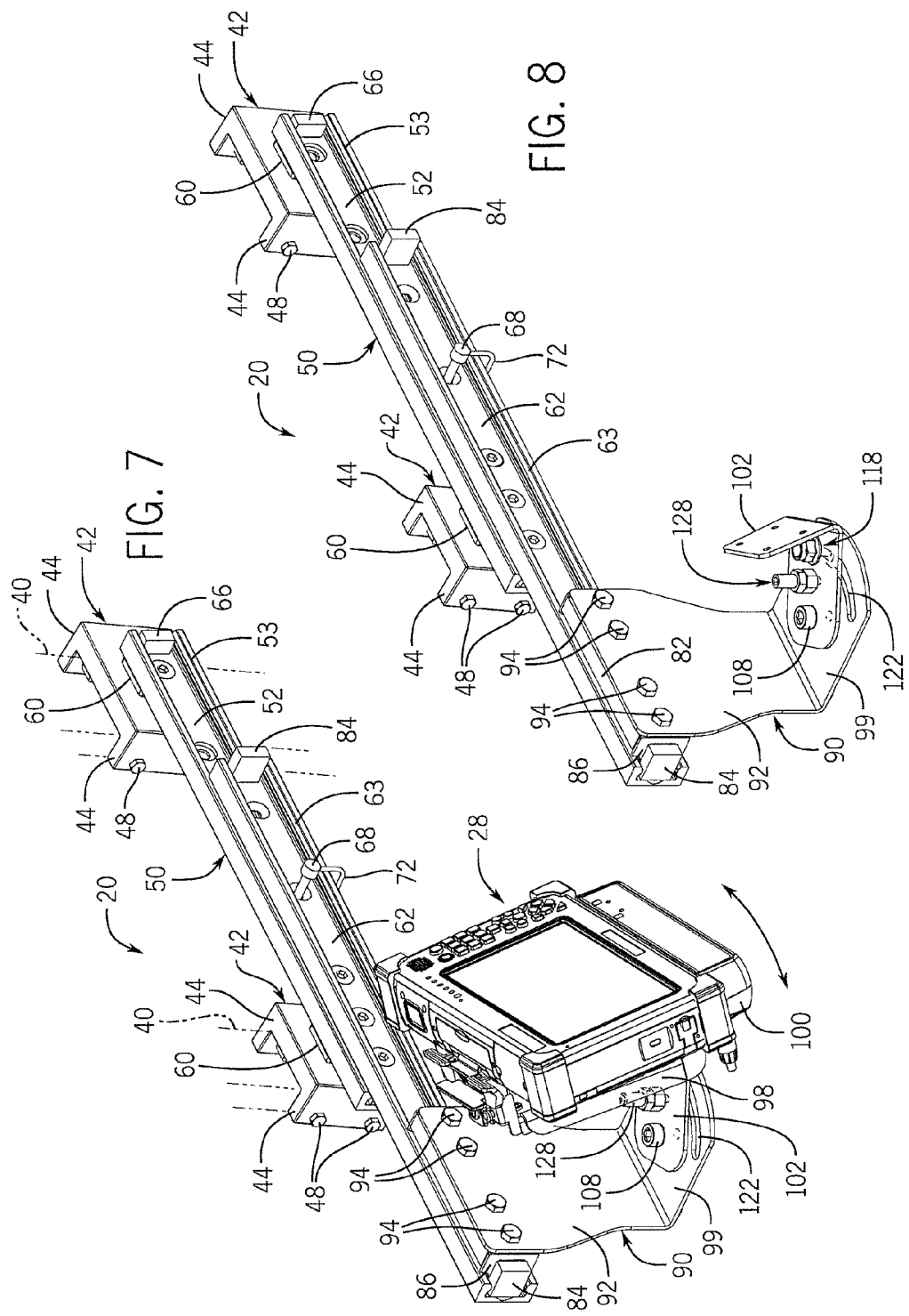

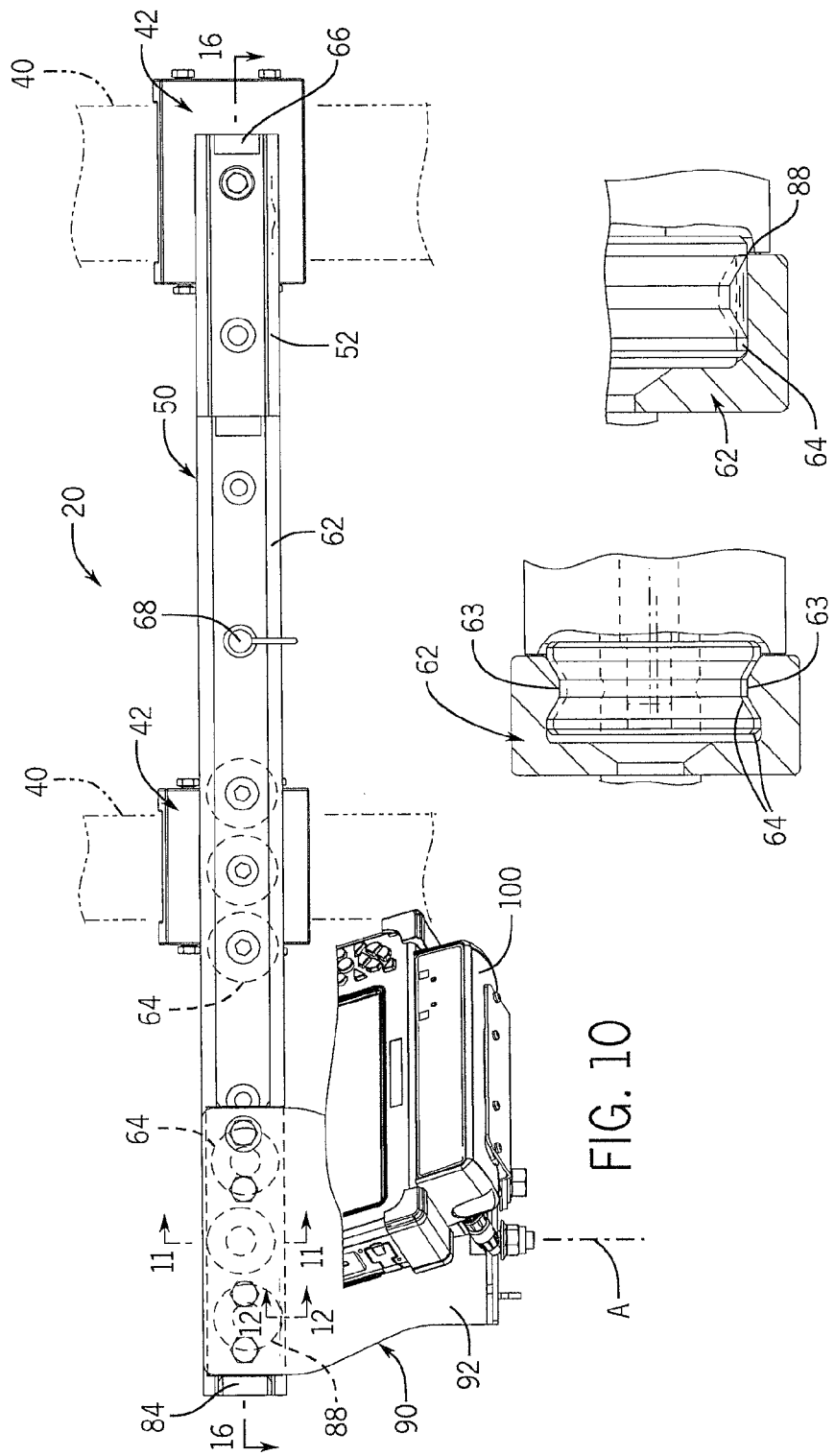

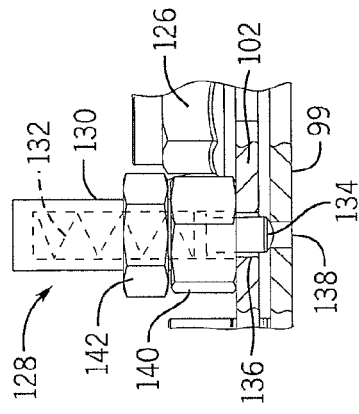
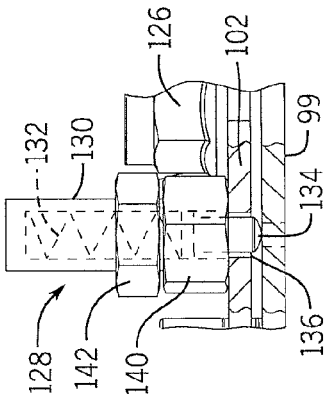
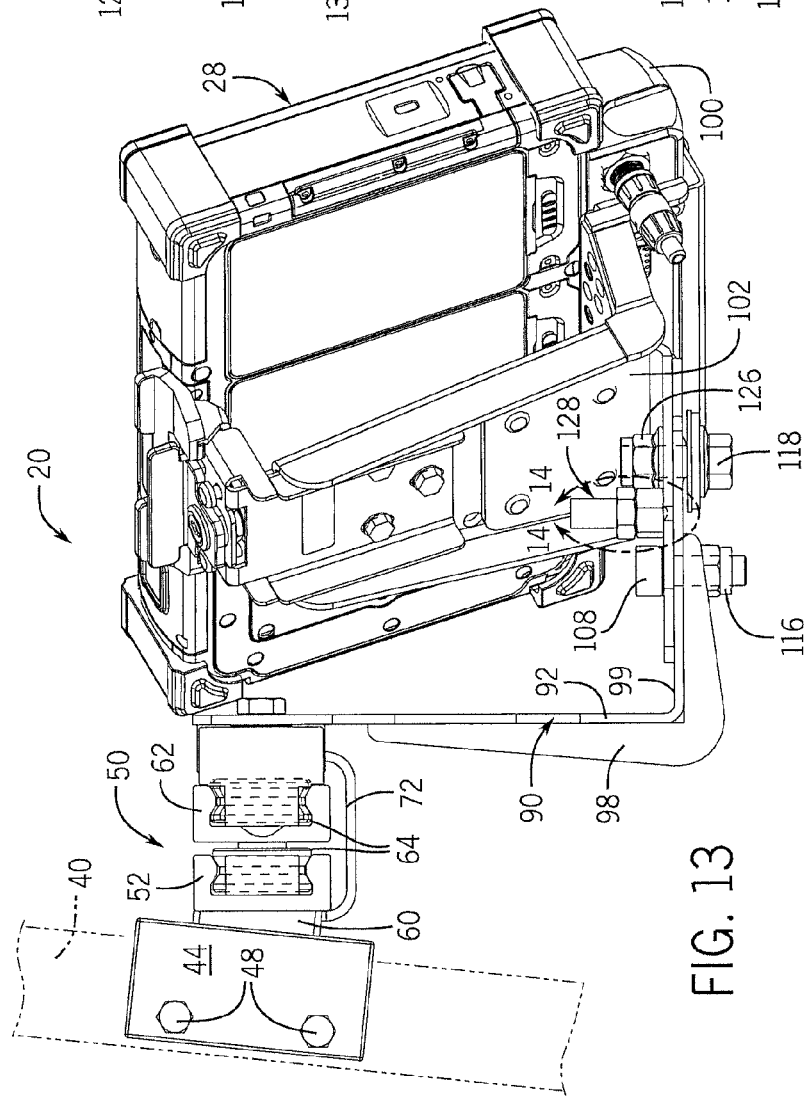

ROPS MOUNT FOR WORK VEHICLE DISPLAY INTERFACE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, and in particular to a mechanism for adjustably mounting a display interface so it can be viewed by the vehicle operator in multiple primary seating positions.

BACKGROUND OF THE DISCLOSURE

Various work vehicles have work implements at both the front and rear of the vehicle. To permit the vehicle operator to view and control the working implement, the operator seat can rotate to face either the front or rear of the vehicle. For example, in a backhoe, the seat is positioned so that the operator faces forward when driving the vehicle and operating the front loader bucket and faces rearward when operating the rear excavator arm.

Space within the vehicle cabin of such work vehicles is typically limited. The available space problem has become an increasing concern in light of the advances in automation and instrumentation used to operate modern work vehicles. For example, it has become commonplace for the instrument panel of modern work vehicles to include a display interface. Such displays can be conventional or touch-screen flat panel displays what provide the operator with a wealth of information, in textual or graphic form, concerning, for example, vehicle system status, vehicle position and implement positioning as well as information regarding the presence and location of above-ground and subterranean features.

Static mounting in a conventional instrument dashboard panel such display interfaces providing information of this sort that may be vital to the operation of the vehicle and both front and rear implements is insufficient. Prior attempts to address this problem typically utilized linkages to mount the displays to the seat armrest or the cab floor. However, mounting the display to the seat armrest is often not possible because there is insufficient room in the cabin for the seat to rotate without the linkage or display interfering with other components, or when mounted to the cab floor without the linkage or display being an impediment for the seat to rotate. Even if there is sufficient space, typically the operator must manipulate such linkage arrangements significantly to orient the display in the desired positions, thereby causing difficult or imprecise positioning of the display and diminishing the operator experience in the vehicle.

This disclosure provides a better solution to the aforementioned problem.

SUMMARY OF THE DISCLOSURE

An adjustable mounting assembly capable of mounting a display interface to the ROPS of a work vehicle that has two operational sides, for example the front and rear sides of the vehicle having the work implements, such as the front loader and rear excavator of a backhoe. The adjustable mounting assembly can include a linear translation mechanism and rotating dock to allow the vehicle operator to readily adjust the display interface so that it is viewable in both the front and rear facing seating orientations of the vehicle.

The mounting assembly can include a telescoping slide assembly having two or more rails and a slider. The first rail can be adapted to connect to a support member within the operator compartment such that it extends primarily in the direction between the operational sides of the operator compartment. The second rail can be connected to the first rail such that it can translate in the direction between the operational sides of the operator compartment. The slider can be connected to the second rail such that it can translate along the second rail.

The rails can be mounted together by at least one roller, for example, a plurality of rollers in which one or more is concentrically mounted and one or more is eccentrically mounted. Each eccentrically mounted roller can be adjustable with respect to the associated rail to apply a load force against the opposing rail. Similarly, the slider can be mounted to the associated rail by at least one roller, for example a plurality of rollers in which one or more is concentrically mounted and one or more is eccentrically mounted. Again, each eccentrically mounted roller can be adjustable with respect to the slider to apply a load force against the associated rail.

The mounting assembly can provide positive positioning, such as at the ends of travel of the movable rail(s), slider and display dock. For example, the slider can translate along the movable second rail between its ends and be positively held in place at or near the opposite ends of the movable rail by mechanical detents.

The display mount can be connected to the slider to translate therewith along the associated rail. The display mount can provide a mounting location for the display interface such that it is movable about a pivot axis which is at angle with respect to the slider. For example, the slider can translate linearly along a generally horizontal axis, and the display interface can pivot about a generally vertical axis.

Further, the display mount can have an angled hanger bracket defining a platform essentially parallel with the slider to which is connected a display bracket providing the mounting location for connecting the display interface to the hanger bracket. The display bracket can be rotatable about the pivot axis between two or more angular orientations. Positive positioning, such as end of pivot locations, can be provided at two or more angular orientation detent locations. The display mount can include a detent mechanism, such as a spring plunger mounted to either of the hanger or display brackets such that the plunger can be received in openings in the other component, such as the hanger bracket platform, at the designated angular orientation detent locations.

The stationary rail of the mounting assembly can mount, via bolts or other fasteners, directly to a support member of the ROPS or otherwise within the vehicle operator compartment. Alternatively, the mounting assembly can include an adjustable mounting bracket for connecting the stationary rail to the ROPS or other cabin support, such as by applying an adjustable clamp force. As an example, the mounting bracket can include a channel member having legs defining a channel therebetween for receiving the support member. One or more fasteners, such as set screws, can be disposed through each of the channel member legs for contacting the support member when disposed in the channel. Tightening the fasteners secures the channel member to the support member. The stationary rail can then bolt to the channel member to mount the mounting assembly.

Thus, in one aspect this disclosure provides: in a work vehicle having an operator compartment and first and second operational sides, an adjustable mounting assembly for a display interface, comprising: a first rail adapted to connect to a support member within the operator compartment to extend primarily in the direction between the first and second operational sides of the operator compartment; a second rail connected to the first rail to translate in the direction between the first and second operational sides of the operator compartment; a slider connected to the second rail to translate along the second rail; and a display mount connected to the slider to translate therewith along the second rail, the display mount providing a mounting location for the display interface that is movable about a pivot axis which is at angle with respect to the slider.

In another aspect this disclosure provides: in a work vehicle having an operator compartment, first and second operational sides, and a roller over protection system (ROPS), an adjustable mounting assembly for a display interface, comprising: a mounting bracket adapted to connect to the ROPS; a linear translation mechanism connected to the mounting bracket to extend primarily in the direction between the first and second operational sides of the operator compartment, the translation mechanism having at least two rails and a slider coupled to at least one of the rails to translate thereon; and a rotational display mount connected to the slider and providing a mounting location for the display interface; wherein the display mount is positioned in proximity to the first operational side of the operator compartment when the translation mechanism is in a first end of travel position and wherein the display mount is positioned in proximity to the second operational side of the operator compartment when the translation mechanism is in a second end of travel position, and wherein the display mount is rotatable about a pivot axis between a first angular orientation detent location and a second angular orientation detent location.

In yet another aspect this disclosure provides: in a work vehicle having an operator compartment, first and second operational sides, and a roller over protection system (ROPS), an adjustable mounting assembly for a display interface, comprising: a linear translation mechanism adapted to be connected to a support member of the ROPS to extend primarily in the direction between the first and second operational sides of the operator compartment, the translation mechanism having at least two rails and a slider coupled to at least one of the rails to translate thereon; and a display mount having a hanger bracket connected to the slider, the hanger bracket being angled to define a platform essentially parallel with the slider to which is connected a display bracket for connecting the display interface to the hanger bracket, the display bracket being rotatable about a pivot axis essentially perpendicular to the hanger bracket platform to move between a first angular orientation and a second angular orientation; wherein the display mount is positioned in proximity to the first operational side of the operator compartment when the translation mechanism is in a first end of travel position and in proximity to the second operational side of the operator compartment when the translation mechanism is in a second end of travel position, and wherein the display mount is positionable in the first angular orientation when the translation mechanism is in the first end of travel position and in the second angular orientation when the translation mechanism is in the second end of travel position.

Still other features of the adjustable mounting assembly will be apparent from the following description and accompanying drawings.

BRIEF DESCRIPTION OF THE DRAWINGS

FIG. 7 is another perspective view showing the mounting assembly and display interface in isolation;

FIG. 8 is a perspective view showing the mounting assembly in isolation;

FIG. 10 is a front elevational view thereof with the display interface shown cut-away;

FIG. 11 is a partial sectional view taken along line 11-11 of FIG. 10 showing an example offset mounting arrangement of the slider rollers, which is representative of an example offset mounting arrangement for the movable rail rollers;

FIG. 12 is a partial sectional view taken along line 12-12 of FIG. 10 showing a roller engaged in an example mechanical detent for end of travel static positioning of the slider, which is representative of an example mechanical detent for the movable rail;

FIG. 13 is a side elevational view of the mounting assembly and display interface;

FIG. 14 is a partial sectional view taking along arc 14-14 of FIG. 13 showing a spring plunger mechanism engaged to positively orient the display interface;

FIG. 15 is a partial sectional view similar to FIG. 14 showing the spring plunger disengaged;

DETAILED DESCRIPTION

As shown in the accompanying figures of the drawings described above, the following describes one or more example constructions of an adjustable mounting assembly, which can be used to mount an operator control interface display within the operator compartment of a work vehicle. Various modifications to the example construction(s) may be contemplated by one of skill in the art.

Figure 1:
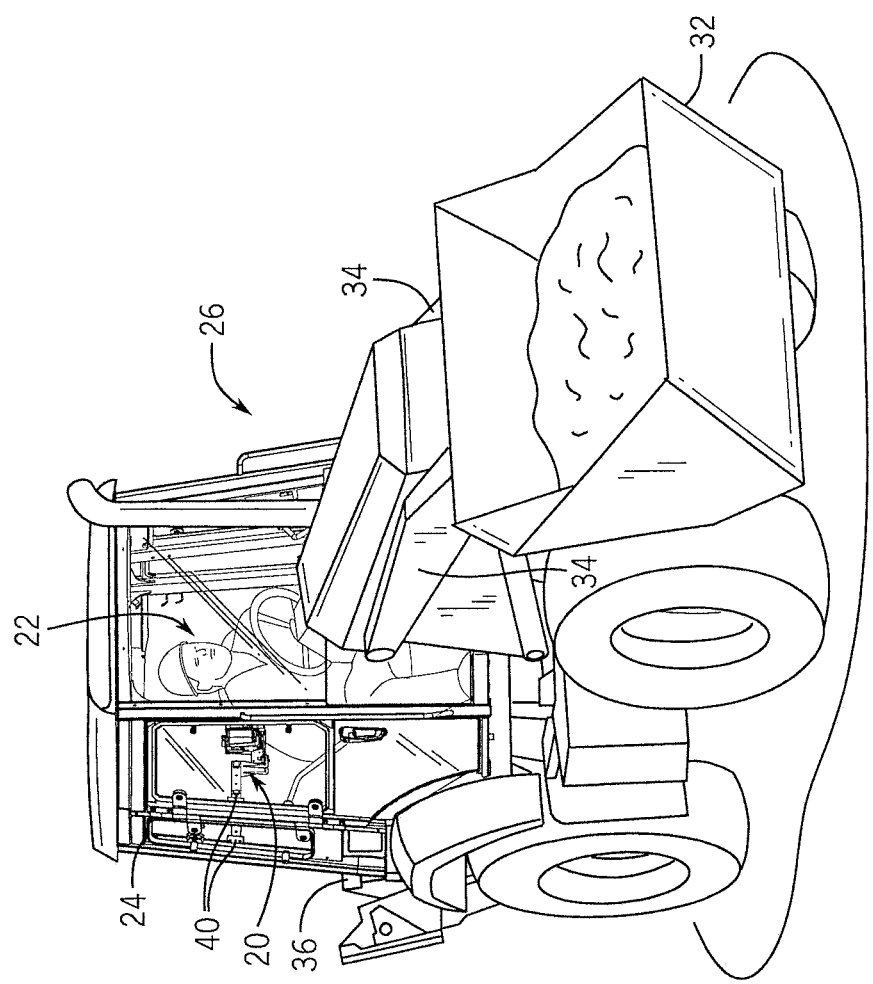
FIG. 1 is a perspective view showing an example work vehicle in the form of a backhoe with a rotatable operator seat incorporating a mounting assembly for a display interface according to this disclosure.

FIG. 1 shows an example application of a mounting assembly 20 incorporated into the operator compartment 22 within the cabin 24 of a work vehicle 26. As shown in FIGS. 2-5, the mounting assembly 20 can be used to mount and adjust the position and orientation of a display interface 28. As will be described in detail, the mounting assembly 20 can readily reposition the display interface 28 in the position and orientation required for the operator to view the display interface 28 when the operator seat 30 faces the front of the work vehicle 26 or is rotated to face the rear of the work vehicle 26. The mounting assembly 20 can both translate the display interface 28 linearly between opposite operational sides of the operator compartment 22 and change the rotational orientation of the display interface 28 for better viewing at each side.

The mounting assembly 20 is thus particularly advantageous when incorporated in a work vehicle that has multiple operational sides, that is where the operator controls the vehicle or different implement attachments to perform work operations. This is especially the case in work vehicles that have multiple operational sides with a fixed cabin and a rotating operator seat, such as the operator seat 30 shown herein.

In the example shown in FIG. 1 and described herein, the work vehicle 26 is a backhoe having a front loader bucket 32 mounted to loader boom arms 34 and a rear excavator bucket 36 mounted to an excavator boom arm (not shown). As a specific example, the mounting assembly 20 can be used advantageously with the Model 310, 410 and 710 line of backhoes commercially available from Deere & Co. of Moline, Ill. It should be noted, however, that the mounting assembly 20 also could be used to facilitate display repositioning in work vehicles with a fixed or rotating operator seat and cabin as well as any work vehicle that has a single operational side.

Also, while for simplicity the mounting assembly 20 is described as being incorporated into a backhoe, the mounting assembly 20 can be utilized with various work vehicles and with various implements. For example, the principles of the mounting assembly 20 disclosed herein can be used with tractors and other agricultural, forestry or construction vehicles, including for example tractors, loaders, skidders, graders, excavators, harvesters and combinations thereof. As such, the term "work vehicle" is not limited to the backhoe described herein.

Figure 6:
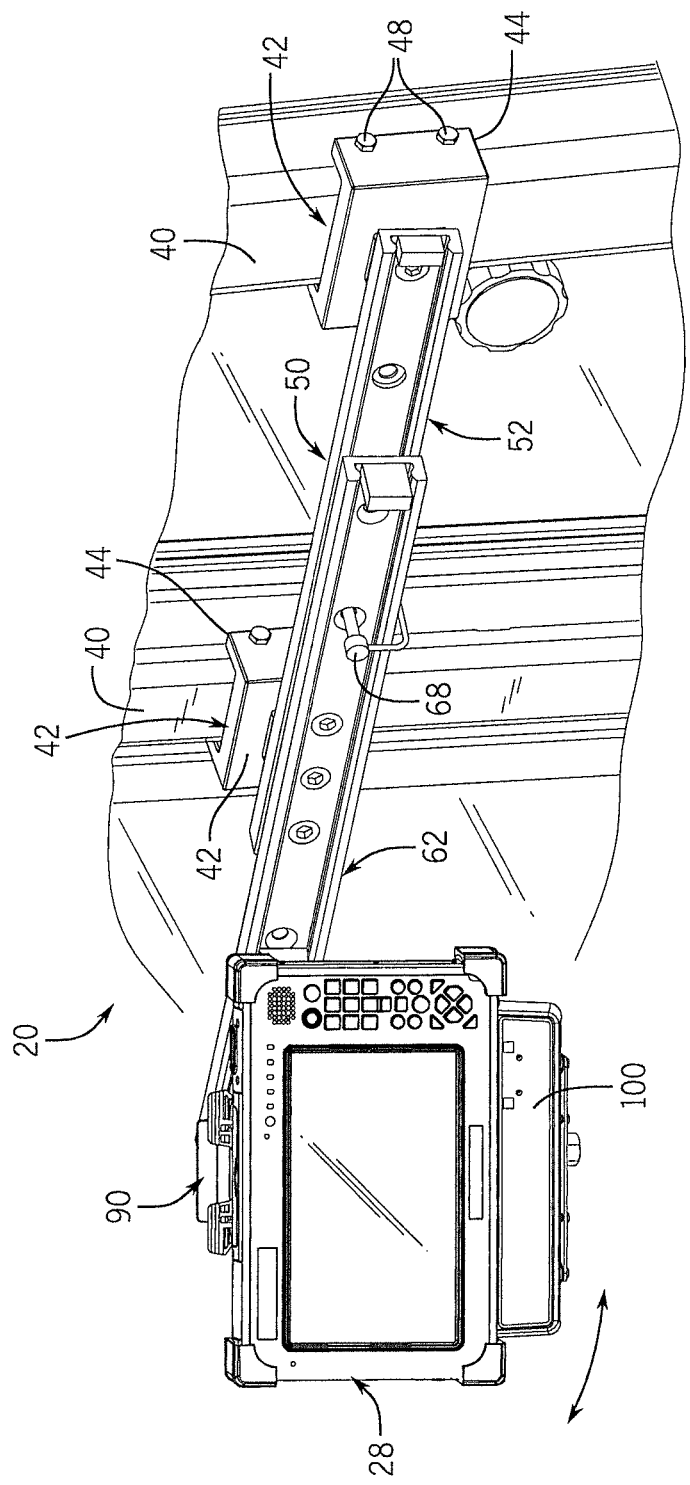
FIG. 6 is a close-up, partial perspective view of the mounting assembly and display interface from within the operator compartment of the vehicle.

Turning now to the example embodiment, FIG. 6 shows the mounting assembly 20 from inside the operator compartment 22 within the cabin 24 of the backhoe 26. The mounting assembly 20 can connect directly to one or more support members 40 of the roller over protection system ("ROPS") of the backhoe 26. The support members 40 can be structural steel bars or posts surrounding the operator compartment 22 and to which other parts (e.g., windows, roof and body panels) of the backhoe 26 are attached. For proper positioning of the display interface 28, the mounting assembly 20 can attach to an upright portion of each support member 40.

As shown in FIG. 6, the mounting assembly 20 can attach to two such existing ROPS support members 40, which can be in parallel, or at an angle to each other, as shown. The mounting assembly 20 can be bolted or otherwise fastened directly to the ROPS support members 40, such as at openings or bosses located on the ROPS support members 40. Alternatively, as shown in FIG. 6, the mounting assembly 20 can include one or more (two are shown in FIG. 6) mounting brackets 42, which can take the form of C-shaped channel members. The C-channel brackets 42 have short legs 44 that define a channel sized to receive the associated ROPS support member 40 such that the legs 44 extend along opposite sides when attached. Each of the legs 44 has one or more threaded openings 46 for set screws 48 or other suitable bolts or threaded fasteners. Threading the set screws 48 into the openings 46 causes the set screws 48 to press against the side walls of the ROPS support member 40 such that tightening the set screws 48 in both legs 44 applies a clamping force to the ROPS support member 40 sufficient to mount the mounting assembly 20.

Having explained example mounting arrangements for attaching the mounting assembly 20 to the ROPS support members 40, the positioning components of the example mounting assembly 20 will now be described. The example mounting assembly 20 includes a translation mechanism and an orienting mechanism so that the display interface 28 linear position and orientation can be adjusted properly for viewing by the operator in each operational position of the seat 30.

FIG. 6 shows that the translation mechanism of the mounting assembly 20 can be a telescoping, or compound, roller slide assembly 50, that is an assembly where two or more parts effect the overall translation by moving relative to one another. Any suitable low friction device can be used to facilitate relative movement, including ball type and roller type mechanisms. While a compound roller slide arrangement is shown in the drawings, the translation mechanism can include a single roller slide arrangement and other single or compound translating assemblies, such as assemblies with low-friction glides, ball-bearings or other non-roller low-friction members for facilitating movement.

As shown in FIGS. 6-9, the example compound roller slide assembly 50 can have a first, stationary rail 52. The stationary rail 52 can have a C-shaped cross-section with a flat back wall and projecting rail legs defining opposing contoured tracks 53. The MR Series of heavy duty rails offered by The Precision Alliance of Fort Mill, S.C., are examples of suitable commercially available rails.

The stationary rail 52 is mounted to each C-channel bracket 42 via mounting fasteners 54 which fit through mounting openings 56 in the stationary rail 52 and into tapped holes 58 in the C-channel brackets 42. One or both ends of the stationary rail 52 can have multiple mounting openings, oblong openings or a combination thereof, to allow for lateral adjustment of the stationary rail 52. Wedge-shaped shim pieces 60 can be placed between the stationary rail 52 and the C-channel brackets 42 to accommodate angulations of the ROPS support members 40, such as shown in FIG. 13, and plumb the mounting assembly 20. Mounting fasteners 54 can attach the shim pieces 60 as well.

Figure 9:
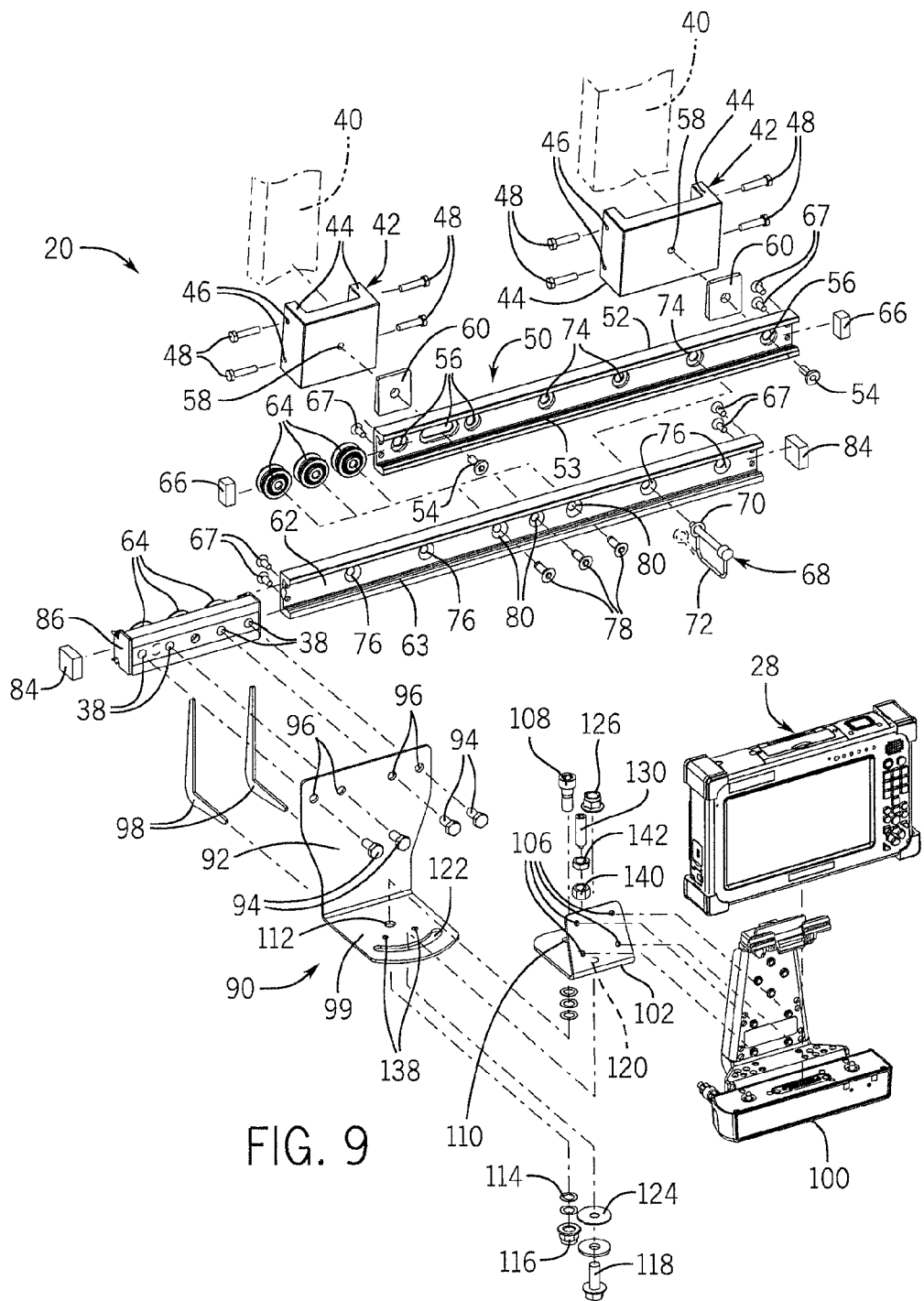
FIG. 9 is an exploded assembly view of the mounting assembly and display interface.

The slide assembly 50 can also have a second, movable rail 62 that mounts to the stationary rail 52 by one or more rollers 64. The movable rail 62 can be constructed the same as the stationary rail 52, although with a different number, location or configuration of openings therein. The number of rollers 64 used to mount the movable rail 62 can be selected according to radial load capacity. For example, as shown in FIGS. 9-11, a set of three rollers 64 can be used to mount the movable rail 62 to sufficiently handle the loading of the typical display interface 28. The rails 52, 62 can be the same or different lengths which are selected to provide the linear travel needed to properly position the display interface 28 at the forward and rear areas of the operator compartment 22. In the example slide assembly 50, the rails 52, 62 are the same length, approximately 18 inches, and the linear travel of the display interface 28 can be approximately 26 inches between fully extended positions. The linear travel dimension can be varied by changing the length of either rail 52, 62 or by changing the mounting position of the rollers 64 on the movable rail 62.

The rollers 64 can be any conventional type of roller construction, such as known ball based rollers in which one or more rows of steel ball bearings are captured between concentrically disposed annular members, such as an inner hub and an outer tread, and front and rear side seals. For example, the R-Series self-lubricated rollers commercially available from The Precision Alliance of Fort Mill, S.C., are suitable ball based rollers. As is understood, the outer treads can rotate relative to their hubs by riding on the ball bearings captured therebetween. The outer treads can have an annular groove or concave contour at or near its center to match the convex contours of the rail tracks 53. The dimensioning of the outer diameter of the annular groove and the spacing between the opposing tracks 53 allow the rollers 64 to roll along the stationary rail 52 but be captured by virtue of the side portions of the rollers 64 having a diameter larger than the spacing between the opposing raceways. The rollers 64 are fed onto the stationary rail 52 through either of its open ends. End pieces 66 mounted by fasteners 67 to the rail 52 close off the ends of the stationary rail 52 to keep the movable rail 62 from derailing off the ends of the stationary rail 52.

The movable rail 62 can be positively held in a static position, such as at either end of travel on the stationary rail 52. Any suitable mechanical detent or other mechanism could be used to provide positive static positioning, including for example magnets and spring-biased ball or plunger detents mounted to either the stationary 52 or movable 62 rail. In the illustrated example, the end of travel positive static positioning of the movable rail 62 can be provided by concave, dished areas or divots 88 formed in the lower track 53 near each end of the stationary rail 52 in locations in which the outer rollers 64 can engage the divots 88. Static positioning could also be achieved using a raised detent projecting from either the upper or lower track 53 of the stationary rail 52.

The movable rail 62 can be held in a fixed position relative to the stationary rail 52 using a tethered pull pin 68. The pull pin 68 can have an anchor 70 with a cable, chain, chord or other flexible connecting member 72 attached to the body of the pull pin 68. The anchor 70 can be mounted into one of multiple spaced apart openings 74 in the stationary rail 52. The pull pin 68 can then fit through one of the spaced apart pin openings 76 in the movable rail 62 and the corresponding aligning opening 74 in the stationary rail 52 to physically interfere with movement of the movable rail 62. Sliding movement can be restored readily by pulling the pull pin 68 at least out from the corresponding opening 74 in the fixed rail 52, or completely out from both aligned openings in the rails 52, 62.

All three rollers 64 can be physically the same and mounted in an identical manner. However, eccentrically mounting one or more of the rollers 64 can provide a pre-load force acting on the stationary rail 52, which will tension the movable rail 62 to reduce play, provide a solid feel throughout the range of motion, and maintain the static position of the slide assembly 50. By way of example, the two outer rollers 64 can be concentrically mounted by roller fasteners 78 threaded through openings 80 in the movable rail 62 into their concentrically bored hubs, and the middle roller 64 can be eccentrically mounted by a roller fastener 78 threaded into its eccentrically bored hub. Because the middle roller 64 is eccentrically mounted, it can be radially offset from the outer rollers 64 and can be positioned closer to, or in contact with, the upper side of the stationary rail 52. The amount of offset, and thus the pre-load force, can be adjusted by changing the rotational orientation of the eccentric hub of the middle roller 64.

A slider 82 having a shorter length than the rails 52, 62 can mount to the movable rail 62 in the same manner as the movable rail 62 mounts to the stationary rail 52, namely by one or more rollers 64. Here again, the number of rollers 64 used to mount the slider 82 can be selected according to radial load capacity and can use the three ball type rollers 64, as described above. Again, the dimensioning of the outer diameter of the annular groove of the rollers 64 and the spacing between the opposing tracks 63 of the movable rail 62 allow the rollers 64 to roll along the movable rail 52 but be captured by virtue of the side portions of the rollers 64 having a diameter larger than the spacing between the opposing tracks 63. Roller fasteners 78 can be used to mount the rollers directly to the back side of the slider 82. Again, all of the rollers 64 can be physically the same and mounted in an identical manner, or one of the rollers (e.g., the middle roller) can be radially offset from the other rollers such that it is closer to, or in contact with, the upper side of the movable rail 62. The same type of eccentric hub arrangement as described above can be used. The eccentric roller pre-loads the slider 82 on the movable rail 62 to provide a solid rolling connection throughout its range of motion and a static holding force. The amount of offset, and thus the pre-load force, can be adjusted by changing the rotational orientation of the eccentric hub. The rollers 64 of the slider 82 are fed onto the movable rail 62 through either of its open ends. End pieces 84, which can be slightly larger than end pieces 66 of the stationary rail 52, can be mounted to the movable rail 62 by fasteners 67 to close off the ends of the movable rail 62 to keep the slider 82 from derailing. Also, the ends of the slider 82 can have end caps 86 which extend down along the sides of the rollers 64. The end caps 86 work to prevent debris and other objects from entering into the rollers 64.

Additionally, the slider 82 can be positively held in a static position, such as at either end of travel on the movable rail 62. Any suitable mechanical detent or other mechanism could be used to provide positive static positioning, including for example magnets and spring-biased ball or plunger detents mounted to either the movable rail 62 or the slider 82. In the illustrated example, the end of travel positive static positioning of the slider 82 can be provided in a similar manner as that of the movable rail 62, that is by concave, dished areas or divots 88 formed in the lower track 63 near each end of the movable rail 62 in locations in which the outer rollers 64 will engage the divots 88. Static positioning could be also achieved using a raised detent projecting from either the upper or lower track 63 of the movable rail 62.

The interaction of the rollers 64 and divots 88 positively position both the movable rail 62 and the slider 82 at the ends of travel at either end of the stationary 52 and movable 62 rails, respectively. The positive position allows the display interface 28 to stay in the translated position while undergoing the normal movements and vibration that occur during operation of the backhoe 26. When the operator wishes to slide the display interface 28, the rollers of the slider 82 and the movable rail 62 can be dislodged from the divots 88 in the singular motion that imparts translation without requiring that excessive force be applied by the operator. For example, the force needed to move the rollers 64 from the divots 88, that is the force required to translate the display interface 28, can be in the range of 5-20 pounds. By adjusting the tension of the eccentric middle roller 64 and sizing the divots 88 the assembly can be set to require a higher or lower force. Moreover, the force can vary from end to end or vary between the slider 82 and the movable rail 62. In any case, no other release action is required to move either the movable rail 62 or the slider 82. The passive positive positioning system greatly enhances the stability of the display interface 28 during use without unwanted intermediate steps to latch and unlatch the slider 82.

FIGS. 7-10 and 13 illustrate an example display mount 90 that can be supported by the slide assembly 50. The display mount 90 can include a hanger bracket 92 which can attach to the front of the slider 82 by fasteners 94 fit through holes 96 of the hanger bracket 92 and threaded into holes 38 in the body of the slider 82. The hanger bracket 92 can be generally L-shaped and supported by one or more right-angle gussets, such as the two spaced apart gussets 98 shown in the figures. The hanger bracket 92 can attach to the slider 82 at the top end and at the bottom end provide a horizontal platform 99 that extends out generally perpendicularly. The platform 99 of the hanger bracket 92 can support a display dock 100, which is rotatably coupled to the hanger bracket 92 by an angled display bracket 102. The display bracket 102 is flat at one end and can be angled back, such as to define an acute angle between it and the flat end of the display bracket 102. This allows the display bracket 102 to mount the display dock 100 so that the top is tilted backward to make the display interface 28 viewable from a nearby location above the mounting assembly 20, such as by a vehicle operator sitting in the operator seat 30. The display bracket 102 can connect any suitable conventional display dock 100 directly or indirectly using mounting holes 106 in the display bracket 102. Also, the display dock 100 can support any suitably configured display interface 28, including a touch-screen, flat panel type display. By way of example, a suitable display dock 100 and display interface 28, such as the T7000 tablet commercially available from Mobile Demand of Hiawatha, Iowa.

The display bracket 102 can connect to the hanger bracket 92 by a stationary pivot pin 108 that defines a pivot axis "A" generally perpendicular to the rails 52, 62 and the direction of linear translation. The pivot pin 108 can be disposed through aligned openings 110 and 112 in the display bracket 102 and platform of the hanger bracket 92, respectively, with one or more washers 114 therebetween to facilitate sliding during pivoting and a nut 116 to secure the pivot pin 108 in place. The display bracket 102 is also connected to the hanger bracket 92 by a traveling pin 118 that is disposed through an opening 120 in the display bracket 102 and an arcuate slot 122 in the platform of the hanger bracket 92. Washers 124 are mounted in the traveling pin 118 on each side for the hanger bracket platform 99 to ease sliding of the display bracket 102, and a nut 126 retains the traveling pin 118 without preventing rotation of the display bracket 102. However, if the display interface 28 is to be held in an orientation between the end of travel locations, the nut 126 can be tightened further to hold the display bracket 102 at any desired intermediate position. The illustrate example allows the display bracket 102, and thus the display interface 28, to pivot through about 90 degrees. However, a larger range, such as 180 degrees or more, could be provided.

In addition, the display mount 90 can include a mechanism for positively orienting the angular position of the display bracket 102 on the hanger bracket 92, and thereby the angular position of the display interface 28 on the slide assembly 50. Specifically, as shown in FIGS. 13-15, the illustrated example includes a spring plunger 128 which can be attached to either the hanger bracket 92 or the display bracket 102 via a suitable connection such as a press-fit or threading. For example, the spring plunger 28 can have a threaded outer body 130 with an internal spring 132 (shown in phantom) biasing a movable plunger 134 with a rounded tip. As an example, a suitable spring plunger 128 is commercially available through the McMaster-Carr catalog, such as any suitably sized standard or short steel body with a long nose steel plunger. In the illustrate example, the plunger 134 should be long enough to extend through, and protect beneath, an opening 136 in the display bracket 102 so that its rounded tip fits into either of the positioning openings 138 (or any additional intermediate openings that may be provided) in the hanger bracket platform 99. The opening 136 can be a tapped hole so that the plunger body 130 can thread directly to the display bracket 102. Alternatively, as in the illustrated example, a nut 138 can be welded to the display bracket 102 in alignment with the opening 136 such that the plunger body 130 can attach to the display bracket 102 by threading into the nut 138. A second nut 140 can be tightened around the plunger body 130 against nut 138 to prevent the spring plunger 128 from loosening.

By pivoting the display bracket 102 so that the tip of the plunger 134 seats in one of the positioning openings 138, the spring plunger 128 will positively orient the display interface 128 in each of the end of travel rotational positions, or any additional intermediate position, provided by the display mount 90 and maintain its orientation during the normal movements and vibrations occurring during operation of the backhoe 26, in particular any jarring associated with starting and stopping or changing the heading of the vehicle. Yet, an operator can reorient the display interface 28 by simply grasping and rotating it clockwise or counter-clockwise. Since the holding force of the spring plunger 128 can be readily overcome by hand, this arrangement provides a passive positive orienting feature without the need to separate lock and unlock the pivoting mechanism. As an example, an applied force in the range of 1-5 pounds would be sufficient to overcome the spring force of the spring plunger 128 without allowing it to unseat too easily during normal operator of the backhoe 26.

Figure 16:
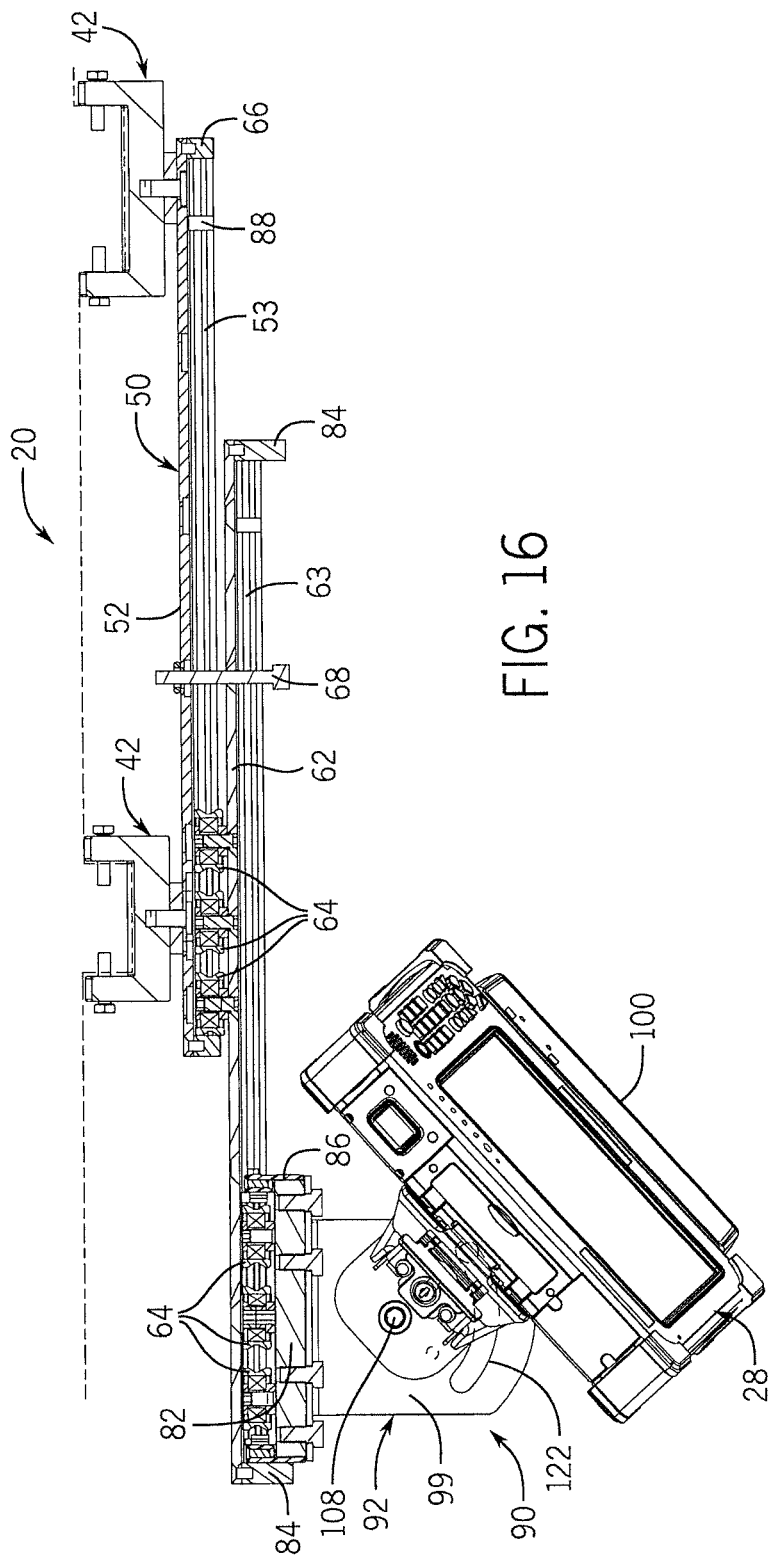
FIG. 16 is a top sectional view taken along line 16-16 of FIG. 10 showing the mounting assembly and display interface in a forward facing operator position.
Figure 17:
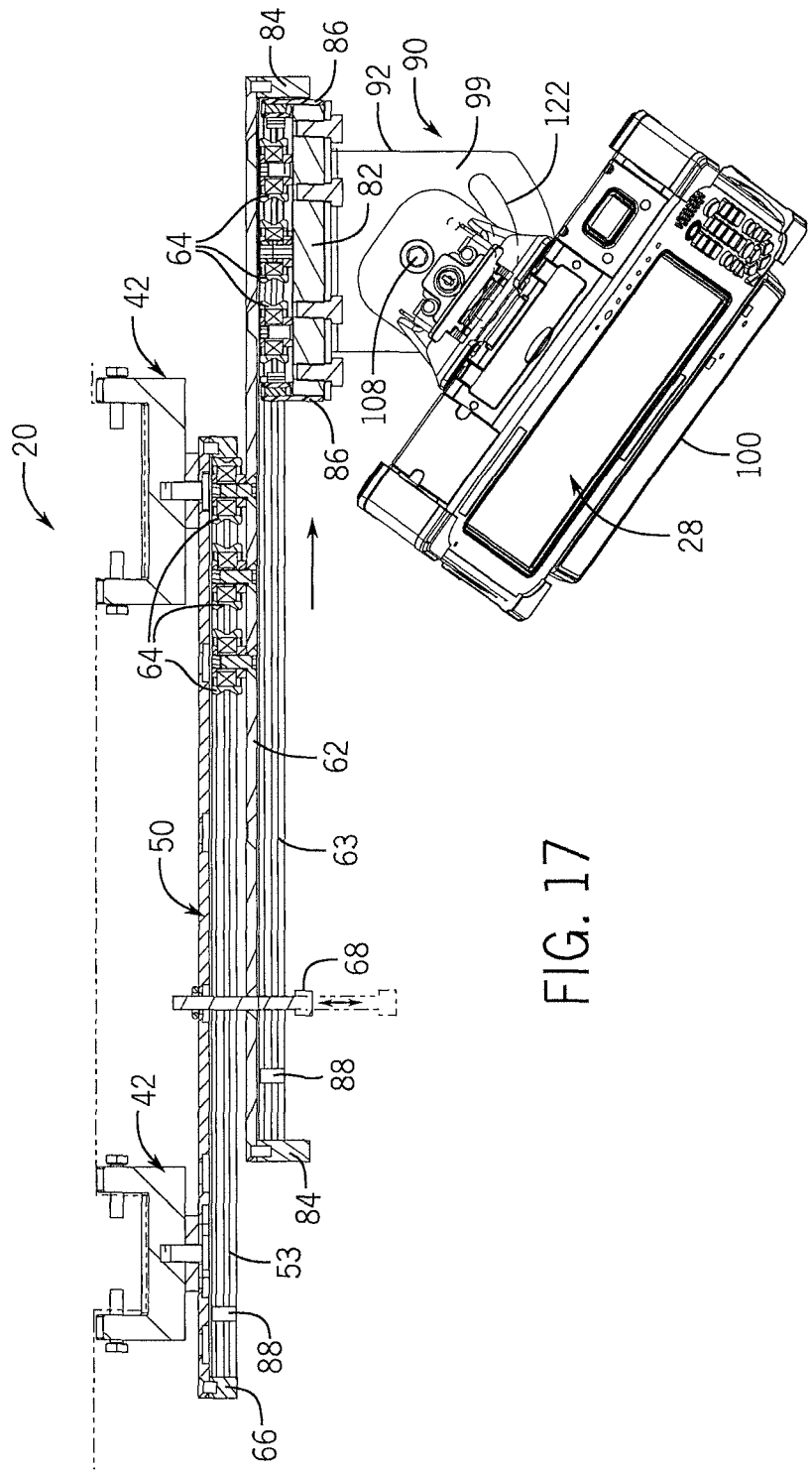
FIG. 17 is a top sectional view similar to FIG. 16 with the mounting assembly shown in a rearward facing operator position.

The operation of the example mounting assembly 20 will now be described with reference to FIGS. 2-5 and 16-17. The pictorial view of FIG. 2 and the top sectional view of FIG. 16 illustrate the position of the mounting assembly 20 and the display interface 28 when in a primary forward position corresponding to when the operator seat faces the front field of the backhoe 26 such as when driving or working the front end loader bucket 32. The pictorial view of FIG. 5 and the top sectional view of FIG. 17 illustrate the position of the mounting assembly 20 and the display interface 28 when in a primary rearward position corresponding to when the operator seat is rotated to face the back field of the backhoe 26 such as when working the excavator bucket 36. As described above, the mounting assembly 20 can provide positive translational and rotational positioning of the display interface 28 in both of the end of travel positions illustrated in these views. Further, the display interface 28 can be adjusted from and into either of these positions passively without requiring the operator to perform any additional locking or unlocking action.

Figure 2:
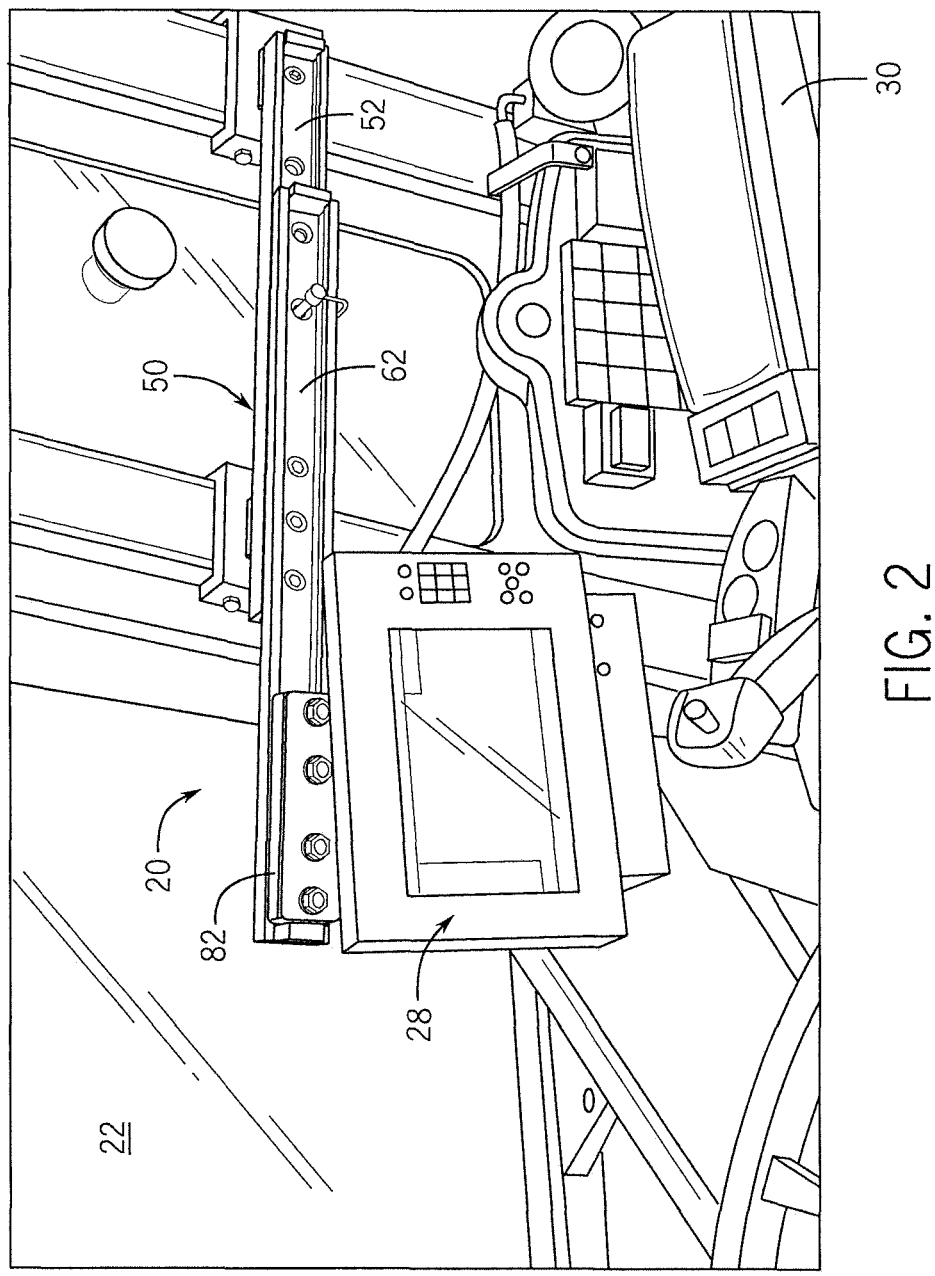
FIGS. 2-5 are simplified pictorial views illustrating the mounting assembly and display interface in various positions within the operator compartment of the vehicle, including as when converting the display interface from use while the operator seat faces the front field of the vehicle, as shown in FIG. 2, to while the operator seat faces the rear field of the vehicle, as shown in FIG. 5.
Figure 3:
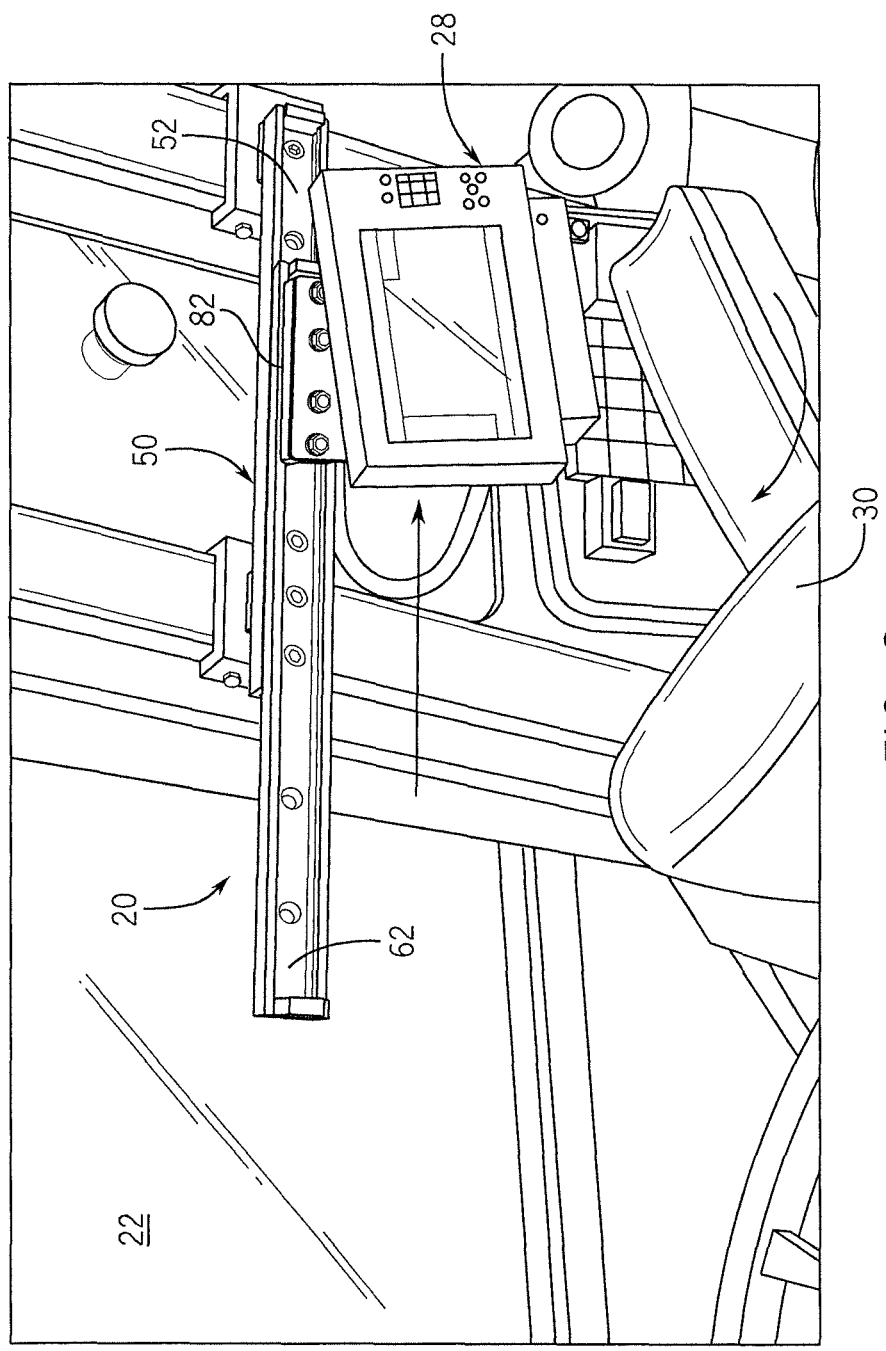
Figure 4:
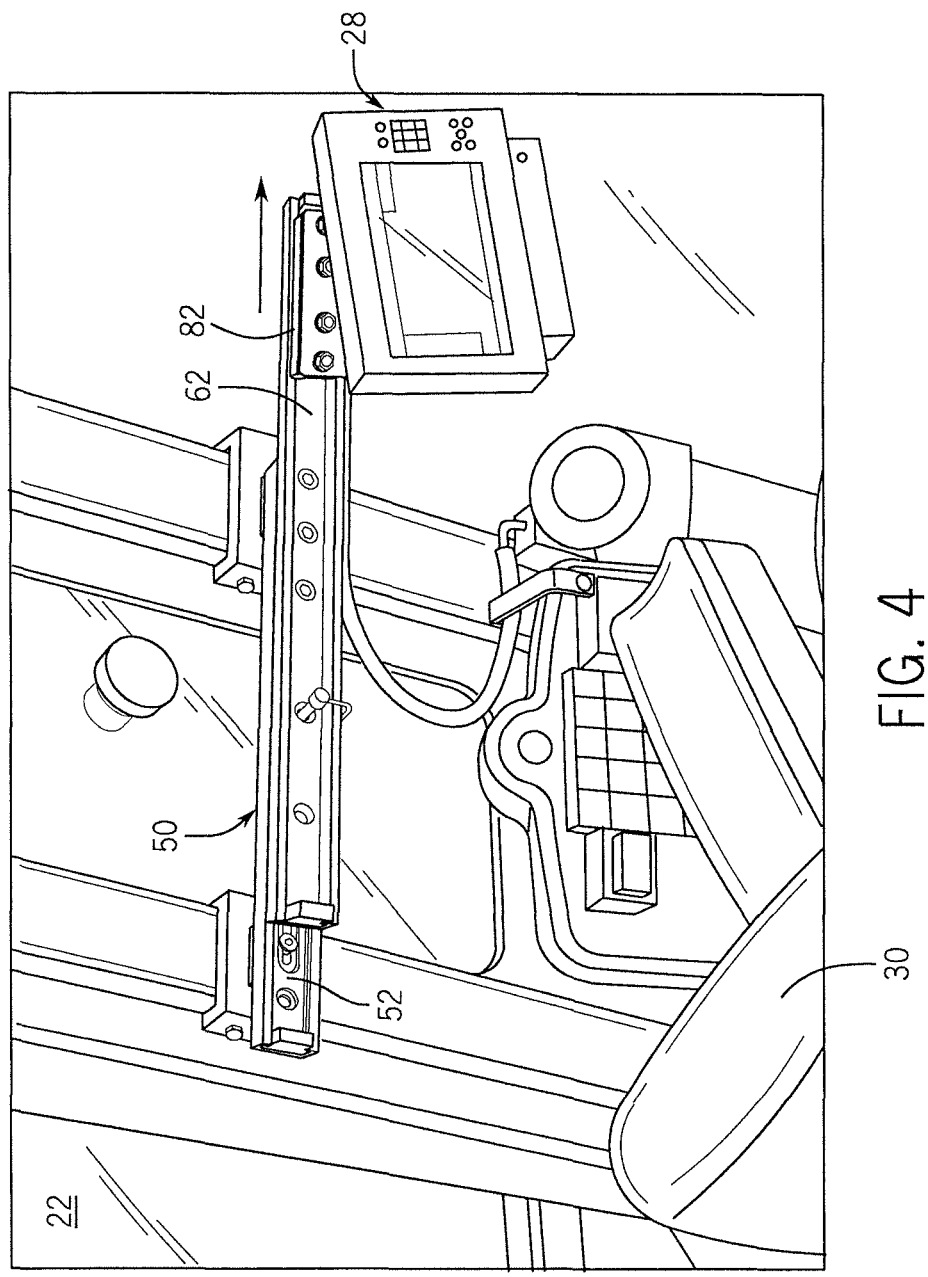
Figure 5:
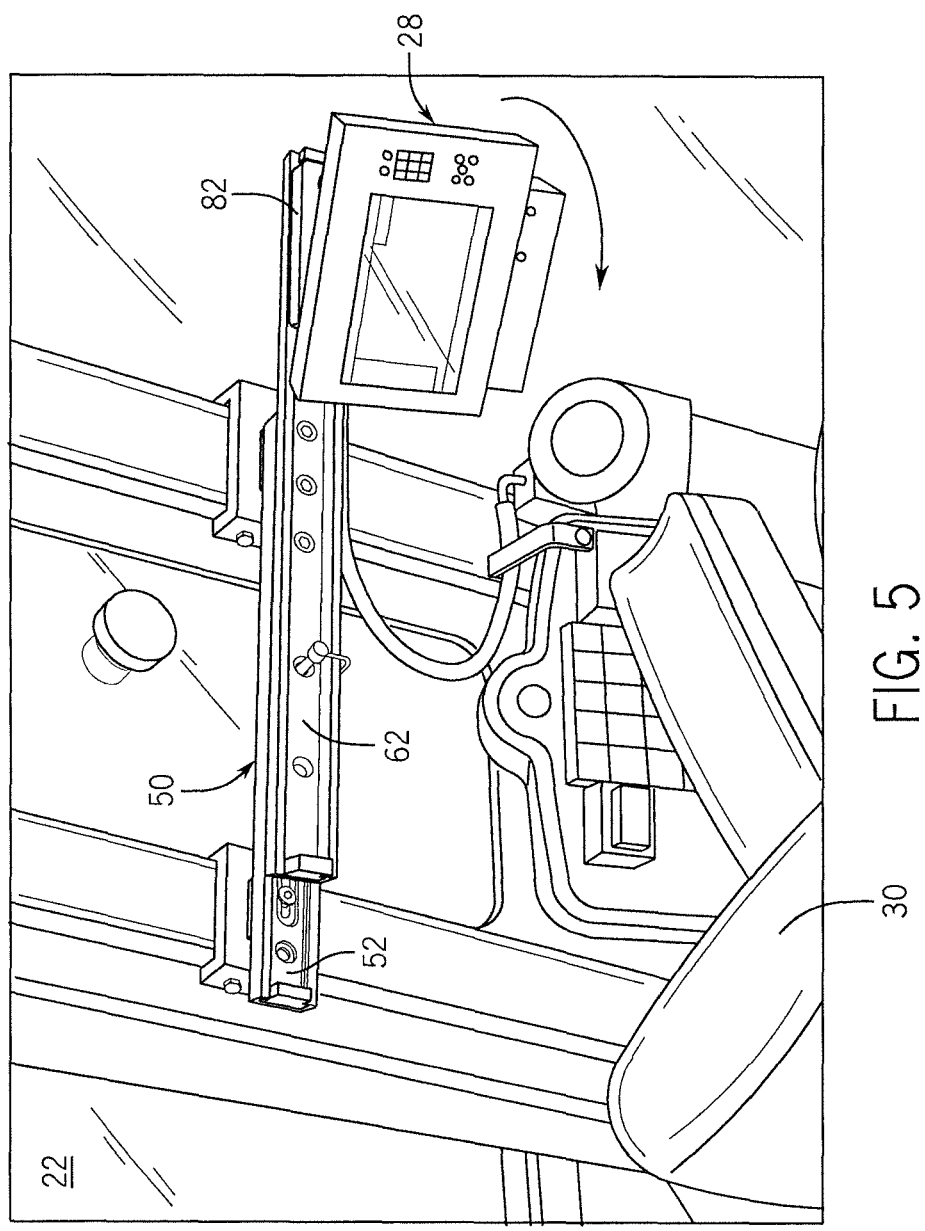

As mentioned, the mounting assembly 20 and display interface 28 would be positioned in the forward position shown in FIGS. 2 and 16 when the operator seat 30 faces the forward field of the backhoe 26. To work the excavator bucket 36, the operator could first rotate the operator seat 30 so that it faces the back field of the backhoe 26. The operator could then reposition the display interface 28 by first removing the pull pin 68 from the rail openings 74 and 76 and grasping and pulling the display interface 28 toward the rear of the backhoe 26. This action would overcome the detent force of engagement of the roller 64 and divot 88 associated with the slider 82 and cause the slider 82 to roll along the movable rail 52. Once the slider 82 contacted the opposite end piece 84 (right in the figures) of the movable rail 62 and overcomes the detent force of the roller 64 and divot 88 associated with the movable rail 62, the movable rail 62 would begin to roll along the stationary rail 52 until it reached the opposite side end piece 66 (right in the figures). The pull pin 68 can then be reinserted in the aligned rail openings 74 and 76 to fix the position of the movable rail 62. Finally, the operator can grasp and rotate the display interface 28 in the clockwise direction until the spring plunger 128 seats in the positioning opening 138 at the other end of travel of the travel pin 118 through the arcuate opening 122 in the hanger bracket platform 99. The mounting assembly 20 and the display interface 28 are thus in the primary rearward position shown in FIGS. 5 and 17 for use with the operator facing the back field of the backhoe 26. The process can be reversed when the operator returns to the facing forward.

It should be noted that the FIGS. 2-5 and 16-17 depict the mounting assembly 20 and display interface 28 positioned in the primary forward and rearward positions. However, the slider 82 and movable rail 62 can be translated to any intermediate position between the end of travel positions. By properly tensioning the eccentrically mounted rollers 64, the pre-load force can aid in maintaining the desired intermediate position. Moreover, the rails 52, 62 allow for multiple set locations for aligning pairs of openings 74 and 76 so that the pull pin 68 can be used to fix select intermediate positions.

It should also be noted that the example mounting assembly 20 provides two degrees of freedom. However, the example mounting assembly could be adapted to provide one or more additional degrees of freedom. For example, a second pivot connection could be included to pivot the display bracket about another axis which is perpendicular to both the pivot axis "A" and the direction of linear translation. Alternatively, the pivot arrangement described could be replaced with a multi-axis hinge or joint, such as a ball joint.

The foregoing detailed description describes the subject of this disclosure in one or more examples. A skilled person in the art to which the subject matter of this disclosure pertains will recognize many alternatives, modifications and variations to the described example(s). The scope of the invention is thus defined not by the detailed description, but rather by the following claims.

What is claimed is:

1. In a work vehicle having an operator compartment and first and second operational sides, an adjustable mounting device for a display interface, comprising:
    at least one mounting bracket mountable to a support member of the operator compartment;
    a first rail mounted to the at least one mounting bracket within the operator compartment to extend primarily in the direction between the first and second operational sides of the operator compartment, the first rail defining a first track and a first member-receiving channel at a first face of the first rail;
    a second rail aligned with the first face of the first rail and defining a second track and a second member-receiving channel at a second face of the second rail so as to open in the same direction as the first member-receiving channel, the second rail having at least one low friction member received in the first member-receiving channel so that the second rail is connected to the first rail to translate in the direction between the first and second operational sides of the operator compartment;
    a slider having at least one low friction member received in the second member-receiving channel so that the slider is connected to the second rail to translate along the second rail; and
    a display mount connected to the slider to translate therewith along the second rail, the display mount providing a mounting location for the display interface that is movable about a pivot axis which is at an angle with respect to the slider;
    wherein the display mount is positioned in proximity to the first operational side of the operator compartment when the second rail and the slider are in a first end of travel position and wherein the display mount is positioned in proximity to the second operational side of the operator compartment when the second rail and the slider are in a second end of travel position linearly opposite the first end of travel position with respect to the first rail; and
    wherein the display interface is rotatable about the pivot axis to be in a first angular orientation when the second rail and the slider are in the first end of travel position and the display interface is rotatable about the pivot axis to be in a second angular orientation when the second rail and the slider are in the second end of travel position.

2. The device of claim 1, wherein the at least one mounting bracket includes a channel member having legs defining a channel therebetween for receiving the support member and at least one adjustable fastener disposed through each of the channel member legs for contacting the support member when disposed in the channel.

3. The device of claim 1, wherein the at least one low friction members of the second rail and the slider are rollers.

4. The device of claim 3, wherein the second rail is mounted to the first rail by a plurality of rollers, and wherein at least one of the plurality of rollers is eccentrically mounted and adjustable to apply a load force against the first rail.

5. The device of claim 3, wherein the slider translates along the second rail and is positively held at the first end of travel position and at the second end of travel position via detent connections including divots formed in the second track.

6. The device of claim 3, wherein the slider is mounted to the second rail by a plurality of rollers, and wherein at least one of the plurality of rollers is eccentrically mounted and adjustable with respect to the slider to apply a load force against the second rail.

7. The device of claim 1, wherein the display mount has an angled hanger bracket defining a platform essentially parallel with the slider to which is connected a display bracket providing the mounting location for connecting the display interface to the hanger bracket.

8. The device of claim 7, wherein the display bracket is connected to the hanger bracket by a pivot pin extending along a pivot axis such that the display bracket is rotatable about the pivot axis between a first angular orientation location and a second angular orientation location.

9. The device of claim 8, further including a traveling pin mounted to the display bracket and disposed within an arcuate slot in the hanger bracket platform through which the traveling pin moves as the display bracket pivots about the pivot axis.

10. The device of claim 9, wherein the display mount includes a spring plunger mounted to the display bracket the plunger of which is received in openings in the hanger bracket platform at the first and second angular orientation locations.

11. In a work vehicle having an operator compartment, first and second operational sides, and a roll over protection system (ROPS), an adjustable mounting device for a display interface, comprising:
    a mounting bracket adapted to connect to the ROPS;
    a linear translation mechanism connected to the mounting bracket to extend primarily in the direction between the first and second operational sides of the operator compartment, the translation mechanism having at least two rails and a slider coupled to at least one of the rails to translate thereon; and
    a rotational display mount connected to the slider and providing a mounting location for the display interface;
    wherein the display mount is positioned in proximity to the first operational side of the operator compartment when the translation mechanism is in a first end of travel position and wherein the display mount is positioned in proximity to the second operational side of the operator compartment when the translation mechanism is in a second end of travel position, and wherein the display mount is rotatable about a pivot axis between a first angular orientation detent location and a second angular orientation detent location; and wherein the linear translation system includes detent mechanisms such that when in the first and second end of travel positions the at least two rails are positively held in a fixed position relative to one another and the slider is positively held in a fixed position relative to the at least two rails.

12. The device of claim 11, wherein the mounting bracket includes a channel member having legs defining a channel therebetween for receiving a support member of the ROPS and at least one adjustable fastener disposed through each of the channel member legs for contacting the support member when disposed in the channel.

13. The device of claim 11, wherein the display mount has an angled hanger bracket defining a platform essentially parallel with the slider to which is connected a display bracket providing the mounting location for connecting the display interface to the hanger bracket.

14. The device of claim 13, wherein the display mount includes a spring plunger mounted to the display bracket the plunger of which is received in openings in the hanger bracket platform at the first and second angular orientation detent locations.

15. The device of claim 11, wherein the second rail is mounted to the first rail by a first plurality of rollers and the slider is mounted to the second rail by a second plurality of rollers, and wherein at least one roller of each of the first and second plurality of rollers is eccentrically mounted and adjustable to apply a load force against the associated first and second rail.

16. In a work vehicle having an operator compartment, first and second operational sides, and a roll over protection system (ROPS), an adjustable mounting device for a display interface, comprising:

a linear translation mechanism adapted to be connected to a support member of the ROPS to extend primarily in the direction between the first and second operational sides of the operator compartment, the translation mechanism having at least two rails and a slider coupled to at least one of the rails to translate thereon; and a display mount having a hanger bracket connected to the slider, the hanger bracket being angled to define a platform essentially parallel with the slider to which is connected a display bracket for connecting the display interface to the hanger bracket, the display bracket being rotatable about a pivot axis essentially perpendicular to the hanger bracket platform to move between a first angular orientation and a second angular orientation;

wherein the display mount is positioned in proximity to the first operational side of the operator compartment when the translation mechanism is in a first end of travel position and in proximity to the second operational side of the operator compartment when the translation mechanism is in a second end of travel position, and wherein the display mount is positionable in the first angular orientation when the translation mechanism is in the first end of travel position and in the second angular orientation when the translation mechanism is in the second end of travel position; and wherein the linear translation system includes detent mechanisms such that when in the first and second end of travel positions the at least two rails are positively held in a fixed position relative to one another, the slider is positively held in a fixed position relative to the at least two rails, and the display interface is positively held in a fixed position relative to the display mount.

17. The device of claim 16, wherein the at least two rails include first and second rails, and wherein the second rail is mounted to the first rail by a first plurality of rollers and the slider is mounted to the second rail by a second plurality of rollers.

18. The device of claim 17, wherein at least one roller of each of the first and second plurality of rollers is eccentrically mounted with respect to the other rollers.

19. The device of claim 18, wherein the detent mechanisms include divots proximate opposite ends of the first and second rails which are configured to receive the at least one eccentrically mounted rollers of the respective first and second plurality of rollers.

20. The device of claim 19, wherein the at least one eccentrically mounted rollers are adjustable to apply a load force against the associated first and second rail.

* * * * *